(12) United States Patent
Takaoka

(10) Patent No.: US 6,459,500 B1
(45) Date of Patent: Oct. 1, 2002

(54) IMAGE PROCESSING APPARATUS

(75) Inventor: Naoki Takaoka, Kanagawa (JP)

(73) Assignee: Fuji Photo Film Co., LTD, Kanagawa (JP)

( * ) Notice: Subject to any disclaimer, the term of this patent is extended or adjusted under 35 U.S.C. 154(b) by 0 days.

(21) Appl. No.: 09/262,086

(22) Filed: Mar. 4, 1999

(30) Foreign Application Priority Data

Mar. 4, 1998 (JP) .......................................... 10-051865

(51) Int. Cl.[7] ................................................. G06K 9/00
(52) U.S. Cl. ........................ 358/1.9; 358/1.2; 358/3.23
(58) Field of Search ........................ 358/1.9, 1.2, 532, 358/518, 521, 3.14, 3.23; 382/263–264, 254, 162, 167

(56) References Cited

U.S. PATENT DOCUMENTS

| | | | | |
|---|---|---|---|---|
| 4,315,318 A | * | 2/1982 | Kato et al. | 250/337 |
| 5,343,390 A | * | 8/1994 | Doi et al. | 378/901 |
| 5,550,888 A | * | 8/1996 | Neitzel et al. | 378/98.12 |
| 5,909,537 A | * | 6/1999 | Furukawa et al. | 347/253 |
| 6,014,474 A | * | 1/2000 | Takeo et al. | 358/453 |
| 6,046,821 A | * | 4/2000 | Curry | 358/1.9 |
| 6,323,959 B1 | * | 11/2001 | Toyama et al. | 358/518 |

* cited by examiner

Primary Examiner—Thomas D. Lee
Assistant Examiner—Stephen Brinich

(57) ABSTRACT

An image processing apparatus according to the present invention comprises an unsharp weighting image forming section (50, 54, 56) for forming from image data an unsharp weighting image which connects a principal subject region and a background region smoothly, a color reproduction parameter forming section (48) for forming at least one of color reproduction parameters of the principal subject region and the background region, an output image forming section (46) for forming the output image data from image data by using at least one of the color reproduction parameters of the principal subject region which is weighted with weight of the unsharp weighting image and the background region which is weighted with the remainder obtained by subtracting the weight of the unsharp weighting image from a reference value. Since the apparatus according to the present invention can separate the principal subject region from the background region and control gradations according to respective regions separately, the apparatus can reproduce colors close to the memory colors even if dodging is performed. Accordingly, the apparatus according to the invention can produce high-quality prints which reproduce images close to an impression of an original scene in a preferable way.

14 Claims, 4 Drawing Sheets

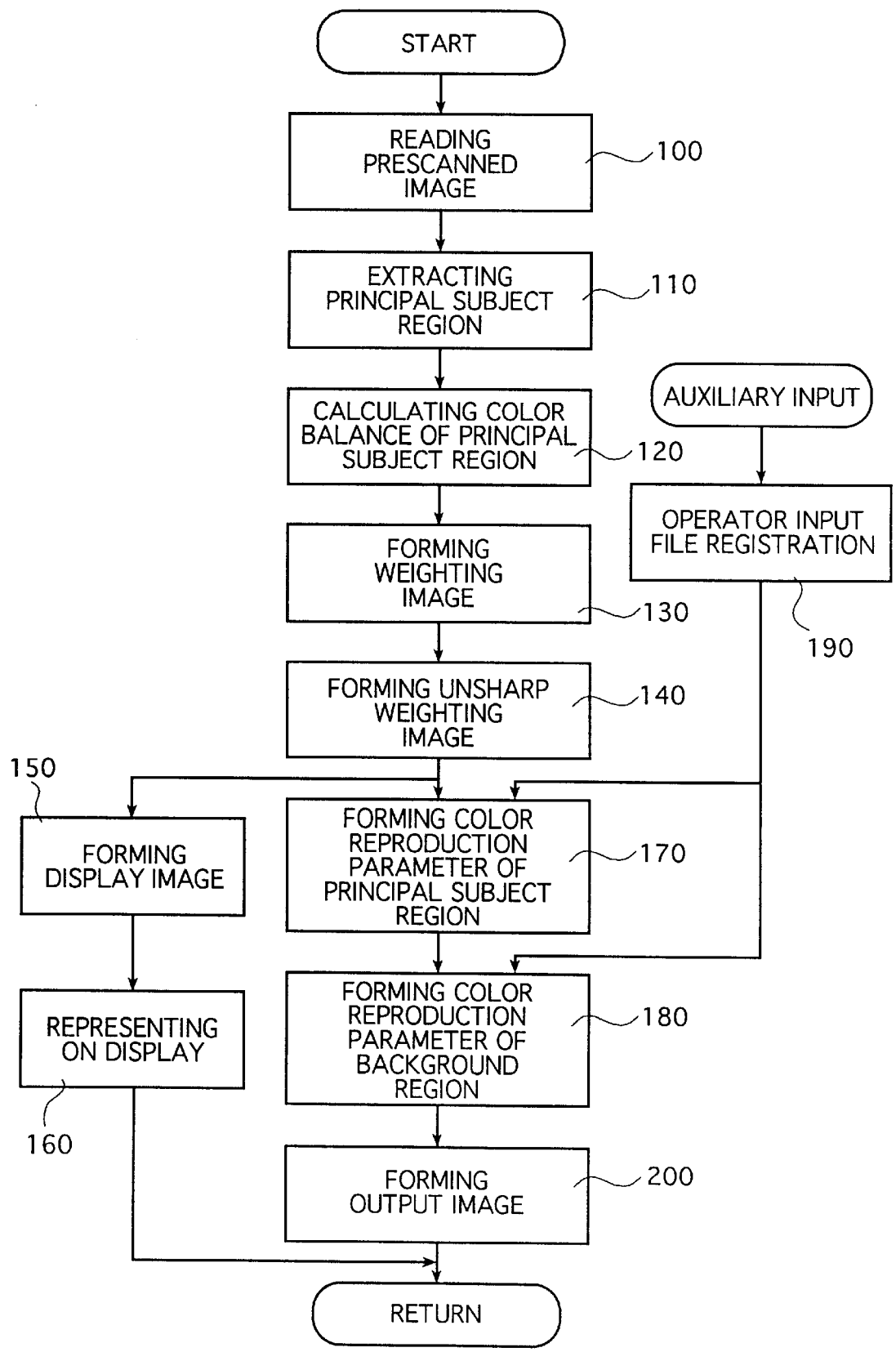

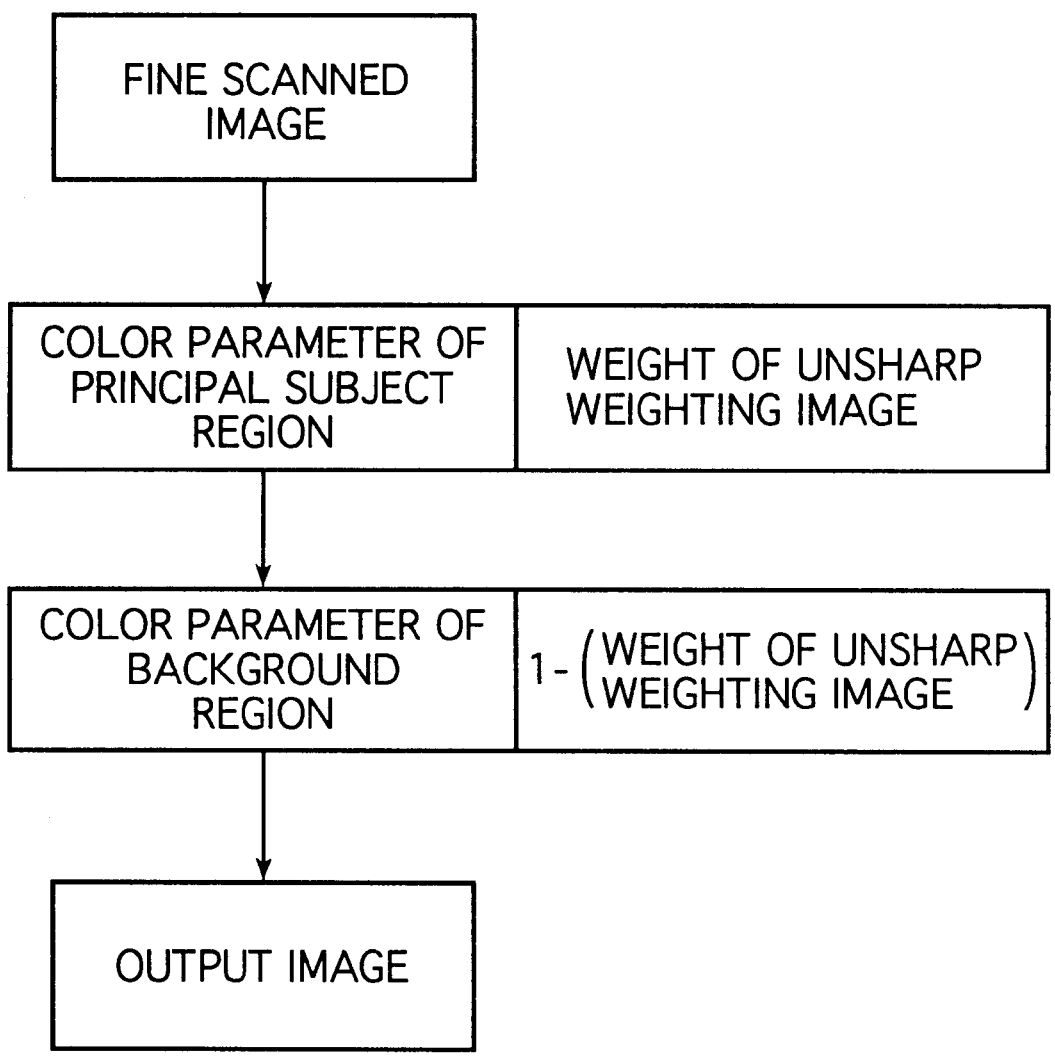

IMAGE PROCESSING APPARATUS

BACKGROUND OF THE INVENTION

The present invention relates to image processing apparatuses which are utilized for digital photoprinters for photoelectrically reading images recorded on films to obtain prints (photographs) that are reproduced from the images.

Images recorded on photographic films (hereinafter called the films) such as negative films, reversal films and the like have conventionally been printed out on photosensitive material (photographic paper) by projecting the on-film image onto the photosensitive material so that the photosensitive material is subjected to surface exposure or so-called direct exposure (analog exposure).

On the other hand, printing apparatus utilizing digital exposure have been put to practical use in recent years. More specifically, a digital photoprinter is used for printing (finishing) an image recorded on a film through the steps of reading the image photoelectrically, converting the read-out image into a digital signal, performing various kinds of image processing in order to obtain image data to be recorded, subjecting photosensitive material to scanning exposure by means of the recording light modulated according to the image data, whereby to record the image (latent image) and developing the recorded image.

As exposure conditions at the time of printing can be determined by processing images with digital data as image data in the digital photoprinter, high-quality prints that have been unavailable until now become obtainable by such as making compensation for image fade-out and improper gradation such as washed-out highlight and dull shadow originating from backlight, electronic flashing and the like, sharpness processing, compensation for color or density failure, compensation for under- or over-exposure, compensation for insufficient quantity of light in a periphery and the like. Moreover, a composite photograph using a plurality of images, image division, a composition of characters and the like can be attained by processing the image data. The image data processing also makes it possible to output edited/processed prints freely in accordance with an intended use.

Furthermore, the digital photoprinter makes image data applicable for other purposes than photography, since the photoprinter allows images to be outputted as prints (photographs) and also allows the image data to be not only supplied to a computer, for example, but also stored in optical and/or magnetic recording media such as floppy disks.

Such digital photoprinter as described above essentially comprises a scanner (image reading apparatus) for reading an image recorded on a film photoelectrically, an image-processing apparatus for subjecting the read-out image to image processing in order to provide image recording data (exposure conditions) and a printer (image recording apparatus) for subjecting photosensitive material to scanning exposure according to the image data outputted from the image-processing apparatus and then for subjecting the exposed photosensitive material to developing processing for printing purposes.

The operation of the scanner includes making read light emitted from a light source incident on a film to obtain projected light for carrying an image recorded on the film, effecting image formation in an image sensor such as a charge coupled device (CCD) by means of an image forming lens so as to read the image by subjecting the projected light to photoelectric conversion, performing various kinds of image processing as the occasion demands and sending data concerning the on-film image (image data signal) to the image-processing apparatus.

The operation of the image-processing apparatus includes setting image processing conditions according to the image data read by the scanner, applying image processing corresponding to the set conditions to the image data and sending output image recording data (exposure conditions) to the printer.

The operation of the printer, that is, a printer utilizing light beam scanning exposure, for example, includes modulating a light beam according to the image data sent from the image-processing apparatus, forming a latent image by scan-exposing (printing) the photosensitive material two-dimensionally and performing a specified developing processing and the like to the photosensitive material to make a print (photograph) reproduced from the on-film image.

On the other hand, recording conditions under which an image is recorded on a film are not fixed and there are many cases where a large amount of difference, i.e., an extremely broad dynamic range, exists between brightness and darkness (densities) such as found in an image recorded using an electronic flash, a backlighted scene and the like.

As a result, when such a film image is exposed by a conventional method to obtain a finished print, there is a tendency that details become imperceptible due to insufficient gradation either in a bright (highlight) portion or a dark (shadow) portion on the print. For example, when a picture of a human individual is recorded against the light, if the picture is exposed such that the image of the person may be preferably clear, the bright portion, such as a sky region, will wash out and become white and its details will become imperceptible. Whereas, if the picture is exposed such that the bright portion, such as the sky region, may become preferably clear, the image of the person will become dull and black and its details will become imperceptible.

Therefore, when a photosensitive material is exposed using a film image having a large difference between brightness and darkness as an original image, there have heretofore been employed a so-called dodging technique.

The dodging technique is a method of obtaining a finished print in which a proper image is reproduced over an entire picture in a manner that an ordinary level of exposure is carried out to a portion having an intermediate image density, an amount of exposure light is increased to a bright (highlight) portion where an image tends to wash out and become white and an amount of exposure light is reduced to a dark (shadow) portion where an image tends to become dull and black, to thereby correct a very bright portion and a very dark portion of the image recorded on film so as to bring the image closer to an impression which people have of an original scene.

Therefore, conventional apparatuses using the direct exposure employ the dodging technique to locally or entirely modify an amount of exposure light in accordance with an image recorded on a film. More specifically, the dodging technique uses a method of carrying out exposure by inserting a blocking plate, an ND filter or the like into an exposure light passage, a method of locally changing an amount of light produced by an exposure light source and a method of forming monochrome films by reversing the bright portion and the dark portion of an image recorded on film and carrying out exposure by superimposing the films, and the like.

On the other hand, the digital photoprinter utilizes a method enabling to reproduce the image closer to the impression of the original scene with a higher degree of freedom by employing image data processing which compresses a dynamic range (hereinafter called as employing dodging processing) of the image so as to preferably reproduce the bright and dark portions than that by employing the dodging processing at the above described direct exposure. Applicants of the present invention have already proposed such method in applications (see JP-A-9-18704 and JP-A-9130609).

Digital image data processing is generally performed by the steps of reading an image recorded on a film photoelectrically to obtain image data, analyzing the thus obtained image data and setting image processing conditions and the like of dodging processing. However, a difference between the image on film (its reproduced image) and the impression of the original scene exists in many cases according to the kind of the scene of the original image, luminance of the original scene and conditions of rays.

Therefore, bringing an output image closer to the impression of the original scene is limited, even if the optimal dodging processing conditions are set according to the image data.

In other words, since the dodging processing has generally been performed in a region of luminance signal (gray), a problem arises to the effect that a sky portion will have the grayish tint of color, when the sky portion or the like is subjected to the dodging processing.

Moreover, another problem also arises to the effect that, when the density of the sky portion is increased, the saturation of the sky portion must concurrently be increased. Unless otherwise the color of sky comes apart from what is resolved to be inherent, that is, a memory color.

SUMMARY OF THE INVENTION

In view of the above problems in the prior art, it is an object of the present invention is to provide an image processing apparatus for processing an input image data obtained from an image recorded on film into output image data and for being preferably utilized in the above digital photoprinter, being capable of reproducing a image close to an impression of an original scene even when dodging processing is per formed, and being capable of controlling gradations region by region, for example, gradation-softening a contrast of a face of a person without changing a contrast of a background region in the image recorded in a fine weather and the like, or gradation-hardening the contrast of the background region without changing the contrast of the face of the person in the image recorded in a cloudy weather and the like.

To achieve the above object, the present invention provides an image processing apparatus which applies specified image processing to image data read photo electrically an image recorded on a film by image reading means so as to form output image data, comprising:

an unsharp weighting image forming section for forming from the image data an unsharp weighting image which connects a principal subject region and a background region to each other smoothly;

a color reproduction parameter forming section for forming at least one of a color reproduction parameter of the principal subject region and a color reproduction parameter of the background region; and an output image forming section for forming the output image data by using at least one of the color reproduction parameter of the principal subject region which is weighted with a weight of the unsharp weighting image and the color reproduction parameter of the background region which is weighted with the remainder obtained by subtracting the weight of the unsharp weighting image from a reference value.

It is preferable here that the unsharp weighting image forming section includes a region extracting subsection for dividing the image data into the principal subject region and the background region, a weighting mask forming subsection for forming a weighting mask relative to the principal subject region and an unsharp mask processing subsection for subjecting to unsharp mask processing a weighting image which weights the principal subject region so as to form the unsharp weighting image.

Moreover, it is preferable that the region extracting subsection divides the image data into the principal subject region and the background region either by automatic analysis of the image or by performing an auxiliary inputting due to an operator and the weighting mask forming subsection forms a weighting mask by analyzing color image data of the principal subject region and then calculating a color balance relative to brightness of the principal subject region and finally setting weight function putting the thus obtained calculated color balance in an intermediate range. Furthermore, it is preferable that the weighting mask forming subsection sets the weight function as a look-up table.

Moreover, it is preferable that the unsharp mask processing subsection forms the unsharp weighting image using the image data obtained by prescanning which reads the image in low resolution by the image reading means prior to fine scanning which reads the image for forming the output image data, and also performs expansion/compression processing to the unsharp weighting image when the output image data is formed from the image data obtained by the fine scanning. Alternatively, it is also preferable that the unsharp mask processing subsection forms directly the unsharp weighting image by using the image data obtained by fine scanning which reads the image by the image reading means for forming the output image data.

Moreover, it is preferable that the color reproduction parameter forming section forms image data for principal subject area analysis which is obtained by multiplying the image data by the weight of the unsharp weighting image and image data for background area analysis which is obtained by multiplying the image data by the remainder obtained by subtracting the weight of the unsharp weighting image from a reference value, and also forms a color reproduction parameter of the principal subject region by multiplying correction gradation of the, principal subject region which is either calculated from characteristic amounts of the image data for the principal subject area analysis and the image data for the background area analysis or inputted by an operator by the weight of the unsharp weighting image, in combination with signals to be added to the image data. In this case, it is preferable that the signals to be added to the image data are at least one of R, G and B signals of three primary colors and a luminance signal.

Meanwhile, the characteristic amounts include a dynamic range, an average density, a pixel density distribution, a color balance of a highlight region, a color balance of a middle density region and a color balance of a shadow region and the like.

Moreover, it is preferable that the color reproduction parameter forming section performs at least one of the steps of:

increasing in gradation softness by placing stress on a highlight region, when the principal subject region is skin and a highlight region and a shadow region exist within the principal subject region and the shadow region is larger than the highlight region;

performing a density shift into within a color reproduction range, when the principal subject region is skin and the principal subject region is almost out of the color reproduction range;

correcting into a magenta tint in gradation, when the principal subject region is skin and a color balance of a highlight region of the principal subject region is bluish; and increasing the gradation in hardness with respect to the background but not increasing in gradation hardness with respect to a gradation of a human individual region.

Moreover it is preferable that color processing relative to the image data is performed by at least one of R, G and B signals of three primary colors and a luminance signal.

Moreover, it is preferable that the color reproduction parameter of the background region is used by inputting a gradation in accordance with a scene prepared previously by an operator or by selecting an appropriate gradation by an image analysis among gradations in accordance with scenes, or otherwise, by selecting an appropriate gradation among gradations which have been adjusted by a user and registered previously. In this case, it is preferable that the gradation or gradations in accordance with the scene or scenes include at least one of a snow gradation where the highlight region becomes a cyan tint, a sky gradation where cyan becomes blue blackish tint and a mountain gradation where green becomes bright green.

Furthermore, it is preferable that the reference value is set as 1 and the unsharp weighting image is normalized with 1.

BRIEF DESCRIPTION OF THE DRAWINGS

FIG. 3 is a flowchart showing a process flow of the embodiment; and

FIG. 4 is a conceptual view showing a method for forming an output image of the embodiment.

DETAILED DESCRIPTION OF THE INVENTION

An image processing apparatus according to the present invention will be described below in detail with reference to a preferred embodiment shown in the accompanying drawings.

Figure 1:
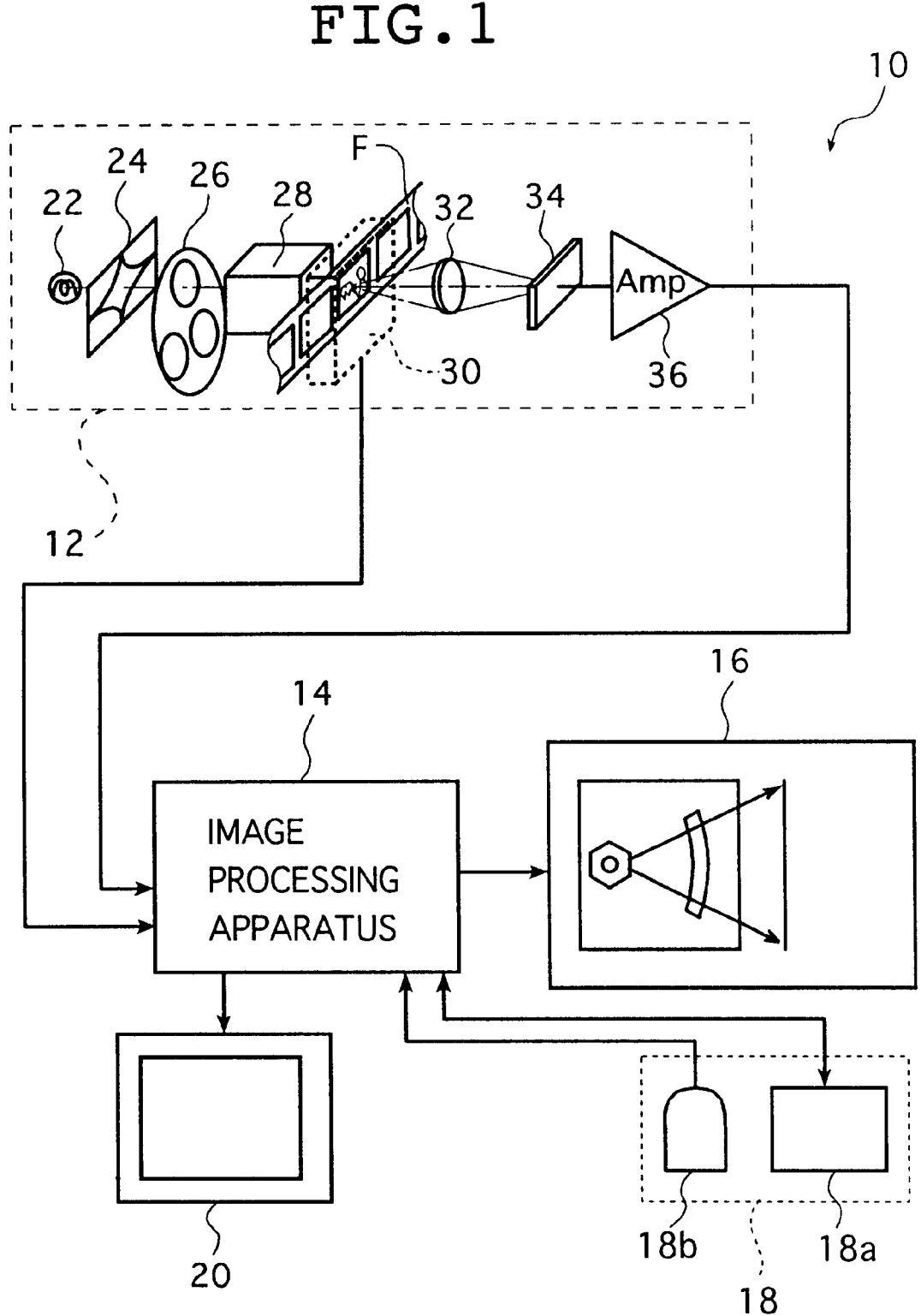
FIG. 1 is a block diagram showing a digital photoprinter utilizing an embodiment of an image processing apparatus according to the present invention.

FIG. 1 shows a block diagram of an embodiment of a digital photoprinter utilizing an image processing apparatus according to the present invention.

A digital photoprinter (hereinafter called as photoprinter) 10 essentially comprises a scanner (image reading means) 12 for reading an image recorded on film F photoelectrically, an image processing apparatus 14 for subjecting the thus read image data (image information) to image processing and for operating and controlling the entire photoprinter 10, and a printer 16 for subjecting a photosensitive material A to image exposure by a light beam modulated according to image data outputted from the image processing apparatus 14 and for developing and outputting the exposed photosensitive material A as a finished print.

Moreover, the image processing apparatus 14 is connected with an operation system 18 including a keyboard 18a and a mouse 18b for inputting (setting) various conditions, a selection and/or indication of processing, an indication and the like of, such as, color and/or density correction, and a display 20 for displaying an image read out by the scanner 12, various kinds of operation indications, a screen for setting and/or registering various conditions and the like.

The scanner 12 is an apparatus for reading an image recorded on the film F and the like photoelectrically frame by frame and includes a light source 22, a variable diaphragm 24, three color filters or R (red), G (green) and B (blue) filters for decomposing the image recorded on the film F to the three primary colors of R, G and B, a color filter plate 26 capable of applying an arbitrary color filter to an optical path by rotation, a diffusion box 28 for making read light incident on the film F to be uniform in the surface direction of the film F, an image forming lens unit 32, a CCD sensor 34 as an area sensor for reading an image of a frame recorded on the film and an amplifier 36.

In the photoprinter 10 as an illustrated example, an exclusive carrier 30 which is mountable on the scanner 12 is provided in correspondence with the kind and size of a negative (or reversal) film of an Advanced Photo System or 135 in size and the like, and with the form and the like of a film such as a strip or a slide. Thus, various films and processing can be dealt with by replacing the carrier 30. An image in a frame recorded on a film to be outputted as a print is transported to a specified read position and held thereon.

As is well known in the art, a magnetic recording medium which is formed on the film of the Advanced Photo System records information such as cartridge ID, film kind and the like, and is also capable of recording various kinds of other data such as photographed date and time, presence or absence of electronic flashing, photographed magnifying power, a photographed scene ID, information on a position of a principal subject or portion and kind of a developing apparatus at the time of photographing, developing and the like. A means for reading these magnetic data is disposed in the carrier 30 corresponding to a film (cartridge) of the Advanced Photo System so that, when the film is transported to the read position, the magnetic data are read and then sent to the image processing apparatus 14 as information on the above described items.

In the scanner 12 as described above, reading light emitted from the light source 22 is incident on the film F after the amount of light of the reading light is adjusted by the diaphragm 24, the color thereof is adjusted through the color filter plate 26 and the reading light is diffused by the diffusion box 28. When the reading light passes through the film F, a projected light carrying an image in a frame recorded on the film F is obtained.

The image of the projected light is focussed on the light receiving surface of the CCD sensor 34 by the imaging lens unit 32 and read by the CCD sensor 34 photoelectrically. Output signals outputted from the CCD sensor 34 are amplified by the amplifier 36 and sent to the image processing apparatus 14. The CCD sensor 34 is, such as, an area sensor having 1380×920 pixels.

The scanner 12 reads the image three times by sequentially inserting the red, green and blue filters of the color filter plate 26 and separates the image of a frame to the three primary colors of red, green and blue.

The photoprinter 10 carries out prescanning for reading an image at a low resolution before carries out fine scanning (fine scanning) for reading the image so as to output a print. Therefore, an image is read six times in total at every frame.

While the scanner 12 reads an original image by separating the original image (projection light of film F) into the three primary colors by means of adjusting the reading light by the color filter plate 26, the scanner for sending an image data to the image processing apparatus according to the present invention may be an image reading apparatus which has three line CCD sensors corresponding to three primary colors of R, G and B, and reads the image by the reading light (projection light) in a slit form when the film F is scan-transported by a carrier, that is, reads an image by slit-scanning.

In the photoprinter 10 illustratively exemplified, the scanner 12 which reads images recorded on films photoelectrically, such as a negative film, a reversal film and the like, is designated as an image data source for the image processing apparatus 14. However, various kinds of other image reading means, photographing means, image data memory means and the like than the scanner 12, including photographing devices such as digital camera, digital video camera and the like, an image reading apparatus for reading a reflected original image, transmission means such as LAN (Local Area Network), computer communication network and the like, media (recording media) and the like such as memory media including a memory card, MO (photomagnetic recording media) and the like are also available.

As described above, output signals (image data) from the scanner 12 is outputted to the image processing apparatus 14 (hereinafter called as processing apparatus 14).

Figure 2:
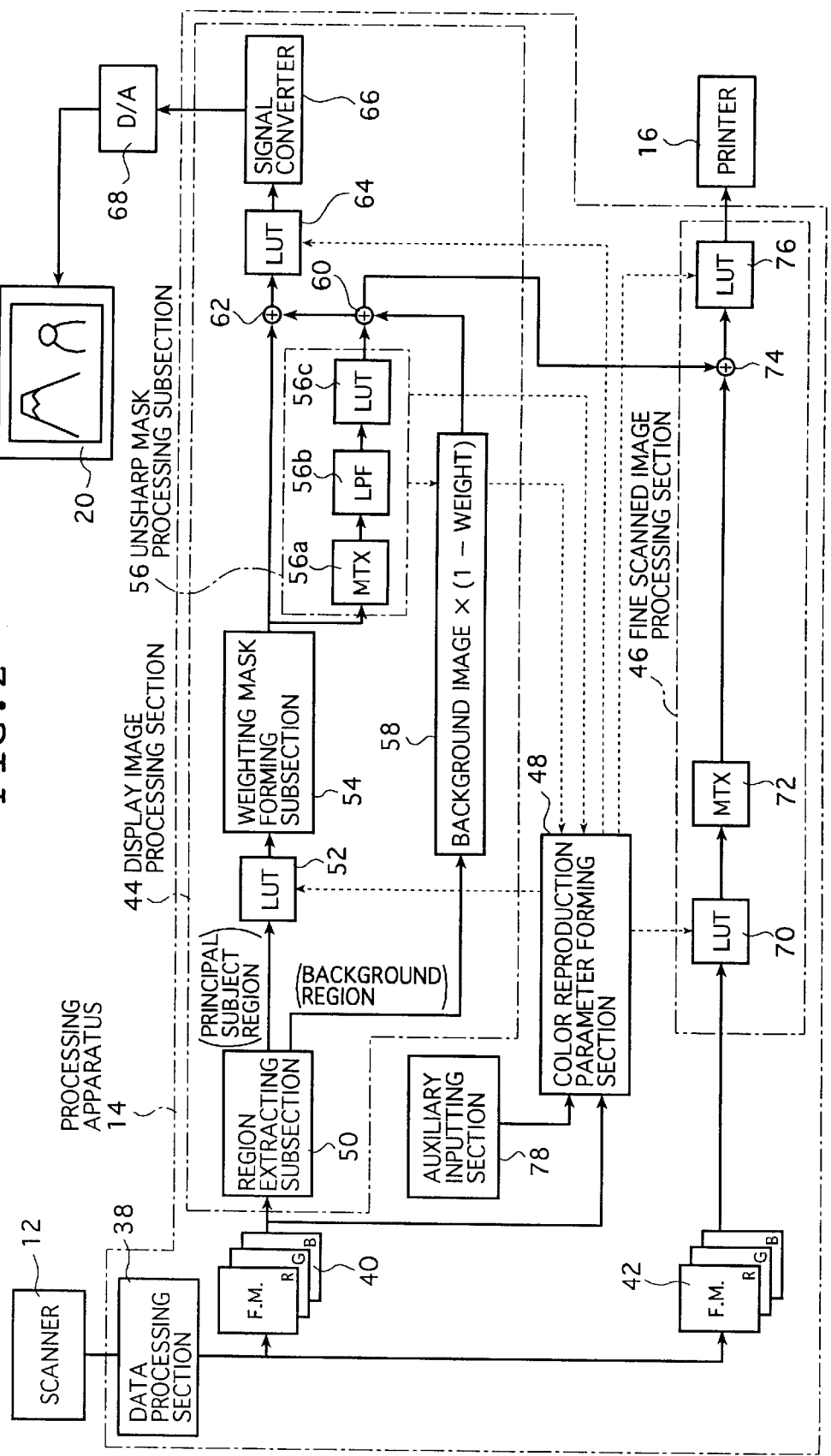
FIG. 2 is a block diagram showing the embodiment of the image processing apparatus of the digital photoprinter shown in FIG. 1.

FIG. 2 is a block diagram showing the processing apparatus 14. The processing apparatus 14 is an embodiment of the image processing apparatus according to the present invention and includes a data processing section 38, a prescan (frame) memory 40, a fine scan (frame) memory 42, a display image processing section 44, a fine scanned image processing section 46 and a color reproduction parameter forming section 48.

FIG. 2 shows primarily sites related with image processing. Other sites such as CPU for controlling and managing the entire photoprinter 10 including the processing apparatus 14, memory for storing information necessary to perform operation and the like of the photoprinter 10, means to determine diaphragm value of a variable diaphragm and storage time of CCD sensor 34 at the occasion of the fine scanning and the like are disposed in the processing apparatus 14. Operation system 18 and the display 20 are connected to various sites by means of CPU (CPU bus) and the like.

Output signals of R, G and B outputted from the scanner 12 are subjected to A/D (analog/digital) conversion, Log conversion, DC offset correction, dark correction, shading correction and the like at the data processing section 38 so as to be converted into digital image data. Among them, prescanned (image) data are memorized (stored) in the prescan memory 40, while fine scanned (image) data are stored in the fine scan memory 42.

The prescanned data and the fine scanned data are fundamentally the same except a resolution (pixel density) of the data and a signal level of the data.

Image information stored in the prescan memory 40 is read into the display image processing section 44 and the color reproduction parameter forming section 48, while the image information stored in the fine scan memory 42 is read out into the fine scanned image processing section 46.

The display image processing section 44 is a site which reads out prescanned data stored in the prescan memory 40, forms unsharp weighting image (data) which connects a principal subject region and a background region to each other smoothly and then forms display image data for being displayed on a display 20 by processing the prescanned data by employing the thus formed unsharp weighting image. The processing section 44 divides preferably the thus read-out prescanned data into the principal subject region and the background region, and weights the principal subject region and subjected to unsharp mask processing so as to form the unsharp weighting image.

The display image processing section 44 includes a region extracting subsection 50, a first look-up table (first LUT) 52, a weighting mask forming subsection 54, an unsharp mask processing subsection 56, a calculator 58, adders 60, 62, a second LUT 64 and a signal converter 66. The region extracting subsection 50, the first look-up table (first LUT) 52, the weighting mask forming subsection 54 and the unsharp mask processing subsection 56 constitute an unsharp weighting image forming section according to the present invention. The first LUT 52 and the weighting mask forming subsection 54 constitute a weighting mask forming subsection in a broad sense of meaning according to the present invention.

Moreover, a D/A converter 68 is disposed to convert image data for displaying (digital signals) formed at the display image processing section 44 into analog signals for displaying on the display 20.

On the other hand, a fine scanned image processing section (output image forming section) 46 is a site which reads out a fine scanned data stored in the fine scan memory 42, and subject the thus read-out fine scanned data to a specified image processing using color reproduction parameter and the like formed at the color reproduction parameter forming section 48 and the like so as to obtain output image data for image recording to be performed by a printer 16.

The fine scanned image processing section 46 includes a first LUT 70, a matrix calculator (MTX) 72, an adder 74 and a second LUT 76.

Moreover, a sharpness processing section for performing sharpness processing may also be provided to the fine scanned image processing section 46.

The color reproduction parameter forming section 48 forms not only various kinds of image processing information based on prescanned data stored in the prescan memory 40, but also the color reproduction parameter based either on data inputted from the display image processing section 44, or on data and the like inputted from an auxiliary inputting section 78 by an operator, and subsequently forms a correction amount which is to be utilized when the output image data to be sent to the printer 16 is formed from the image data of the original image by the fine scan reading. Information formed in the color reproduction parameter forming section 48 is sent to look-up tables 52, 64, 70 and 76.

Components in each section will now be described.

First of all, the region extracting subsection 50 of the display image processing section 44 reads out prescanned data from the prescan memory 40, and extracts the principal subject region from the prescanned data, to thereby divide the data into the principal subject region and the background region. This extracting action of the principal subject region can be carried out either by automatic analysis of image utilizing a region extracting technique or by performing an auxiliary inputting operation by an operator.

A method for extracting the principal subject region is not specifically limitative. Illustrative are methods, such as a method of extracting the principal subject region from color continuity and the like by pointing a point within the principal subject region by an operator using a mouse 18b and the like, another method of cutting out the principal subject region by the operator using the mouse 18b, still another method of performing an automatic extraction using a known principal subject region extracting algorithm and the like.

Moreover, the automatic principal subject region extracting algorithm is disclosed such as in Japanese Unexamined Patent Publication (JPA) No. 9-138470 which illustrates a principal subject region extracting method to the effect that a plurality of different principal portion extracting methods such as a method to extract a specified color, a method to extract a specific configuration pattern, a method to remove a region which is thought to correspond to a background and the like are evaluated and their weights are set in advance, and then, after a principal portion is extracted by each extracting method, each extracted principal portion is weighted with corresponding set weight, and finally the principal portion is judged and extracted according to the obtained result. Other principal portion extracting methods as disclosed in following JPAs are also preferably available: JPA No. 4-346333, JPA No. 5-158164, JPA No. 5-165120JPA No. 6-160993, JPA No. 8-184925, JPA No. 9-101579, JPA, No. 9-138471 and the like.

The first LUT 52 analyzes color image data of the extracted principal subject region, and then calculates a color balance relative to brightness (luminance) of the principal subject region so that a weight function based mainly on the calculated color balance is set. The weight function is here set as a look-up table.

The weighting mask forming subsection 54 forms a weighting image by adding weight to image data of the principal subject region using the first LUT 52.

The unsharp mask processing subsection 56 subjects the obtained weighting image to an unsharp mask processing so as to obtain an unsharp weighting image. The unsharp mask processing subsection 56 includes, for example, a matrix calculator (MTX) 56a, a low-pass filter (LPF) 56b and a look-up table (LUT) 56c, though not limitative to them. MTX 56a forms luminance image data as a luminance signal for performing dodging processing from the weighting image sent from the weighting mask forming subsection 54. LPF 56b subjects the thus obtained luminance image data to low-pass filter processing for taking out a low frequency component so that the luminance image becomes unsharp two dimentionally and unsharp image data of the read image is obtained. LUT 56c compresses the dynamic range of the thus obtained unsharp image data.

As a method of creating the luminance image data is illustrated a method of using a value of one-third of the mean value of R, G and B image data, a method of converting color image data into the luminance image data using YIQ base and the like.

The method of obtaining the luminance image data using the YIQ base includes illustratively, for example, a method of calculating only the Y component of the YIQ base from the red, green and blue image data by the following formula.

$$Y=0.3R+0.59G+0.11B$$

As to a low-pass filter (LPF) used in the LPF 56b, although an LPF of FIR type (Finite Impulse Response) which is generally used for creating an unsharp image may be used in the above processing, it is preferable to use an LPF of IIR type (Infinite Impulse Response) because the latter can form unsharp image data in which an image is made very unsharp in a small-sized circuit.

Moreover, a median filter (MF) may be used, instead of the LPF 56b. It is preferable to use the MF because it can form an unsharp image data which saves an edge and cuts a noise (high frequency component) in a flat portion. Moreover, it is more preferable to use the MF and the LPF concurrently, so as to weight separately images obtained by the MF and the LPF and then add the weighted images, because the MF can create an unsharp image data which makes the image very unsharp by making use of the above described advantage of MF.

The unsharp image data created by the LPF 56b is sent to LUT 56c and then processed by a dynamic range compression table because of the necessity described below.

The image density range which can be recorded on the photographic film F is generally wider than a reproducible image density range (gamut) of a print. For example, an image with a density range (difference between the maximum density and the minimum density being dynamic range) greatly exceeding the gamut of the print such as found in an image recorded using an electronic flash, a backlighted image and the like may be recorded in some cases.

In such cases, it is unable to reproduce all the image data (pixels) on the print so that a high density portion (intensity of read signals being weak) on the film exceeding the gamut, that is, a bright portion of a subject comes to be a washed-out highlight on the print, while a low density portion on the film exceeding the gamut, that is, a dark portion of a subject comes to be a dull shadow on the print. Therefore, it is necessary to make image data to correspond to the gamut of the print by compressing the dynamic range of the image data so that an image with all the reproduced image data may be obtained. In other words, it is necessary to process (process by dodging) image data so that the dynamic range may be compressed by adjusting densities of bright and dark portions without changing gradation of a middle density portion, in order to provide a similar effect as a dodging processing by a conventional direct exposure.

An unsharp weighting image is formed in the unsharp mask processing subsection 56 according to the above way. Meanwhile, in the calculator 58, the image data of the background region is multiplied by the remainder obtained by subtracting the weight of the unsharp weighting image from a reference value which will be 1 if the weight of this unsharp weighting image is normalized with 1. This multiplied image data and the unsharp weighting image data are added in the adder 60, and then, the added image data is further added to a weighting image data sent from the weighting mask forming subsection 54 in the adder 62 so that dodging processing may be performed and an image data for displaying may be obtained.

This image data for displaying is converted of its gradation into the final image data for displaying in accordance with characteristics of the display 20 at the second LUT 64, and then, is converted to signals associated with the display 20 at the signal converter 66, and finally is subjected to a D/A conversion at D/A converter 68 so as to be represented on the display 20.

Then, the first LUT 70 of the fine scanned image processing section 46 which reads out image data stored in the fine scan memory 42 and performs gray balance adjustment, bright (density) correction and gradation correction is configured in a manner that LUTs for performing respective corrections and adjustment are in cascade connection to each other. Each LUT of the first LUT 70 is formed and set at the color reproduction parameter forming section 48.

MTX 72 which performs color correction to enhance saturation of image data processed at the first LUT 70 carries out a matrix calculation set according to spectral characteristics of a film F, spectral characteristics of a photosensitive material (photographic paper), characteristics of developing processing and the like and then performs saturation correction (color correction) so that the thus obtained output image (information) has a preferable color finish, though subjected to dodging processing.

In the adder 74, the image data processed at MTX 72 to be main data is added with the added image data obtained at the adder 60 by adding the unsharp weighting image and the product of the background image and the remainder obtained by subtracting the weight from a reference value, for example 1, thereby performing dodging processing while compressing the dynamic range of the image data in a nonlinear way and making the dynamic range and gradation and density of bright and dark portions of the output image data to be as appropriate so that output image to allow prints to reproduce high-quality image having the same impression of the original scene (photographed scene) is obtained.

In the above case, since the above described unsharp weighting image is formed from the prescanned image data and has different number of pixels (pixel density) from that of the fine scanned image data, the unsharp weighting image must be subjected to expansion/compression processing at a processing section (not shown) prior to being subjected to addition processing at the adder 74 so as to correspond to the fine scanned image data.

At the second LUT 76, the image data obtained by subjecting the fine scanned image data to addition processing at the adder 74 is converted of its gradation by employing the color reproduction parameter so as to obtain image data preferably corresponding to final color emerging on the photosensitive material A and is then subjected to, for example, a signal conversion (not shown) and finally outputted into the printer 16.

The operation of the embodiment of the present invention will now be described in reference to a flowchart shown in FIG. 3.

At first, in the step 100 in FIG. 3, the prescanned image is read out from the prescan memory 40 into the region extracting subsection 50 of the display image processing section 44. In the next step 110, a principal subject region such as a human individual and the like is extracted form the thus read-out prescanned image so that the principal subject region and the background region are divided from each other. As described above, this division is executed either automatically or by performing an auxiliary inputting operation by an operator.

In the step 120, color image data of the principal subject region is analyzed and the color balance relative to brightness of the principal subject region is calculated and then the weight function is set in the first LUT 52 by putting the thus obtained color balance in center. Given a skin color, for example, color balances of all skin colors of a bright, a dark and a medium skin color and the like are formed and set weights according to each brightness.

In the step 130, a weighting image which weights the image data of the extracted principal subject region is formed at the weighting mask forming subsection 54, and in the next step 140, the unsharp weighting image is formed by subjecting the thus obtained weighting image to the unsharp mask processing at the unsharp processing subsection 56. The weight of the unsharp weighting image is sent to the color reproduction forming section 48, in order to form a correction amount of gradation which will be used when the final output image data is formed.

In the step 150, the image data for displaying on the display 20 is formed. The product obtained by multiplying the image data of the background region by the remainder obtained by subtracting the weight of the unsharp weighting image from a reference value, for example 1 at the calculator 58 is added with the unsharp weighting image at the adder 60. The resulted image data is added with the weighting image sent from the weighting mask forming subsection 54 at the adder 62 so that the image data is dodged to form an image data for displaying.

In the step 160, the thus obtained image data for displaying is subjected to gradation conversion at the second LUT 64 and then is converted into signals corresponding to the display 20 at the signal converter 66 and is further subjected to D/A conversion at a D/A converter 68 and is finally represented on the display 20.

Meanwhile, color reproduction parameters of the principal subject region and the background region are formed at the step 170 and at the step 180 respectively, in order to form the output image data.

The above processing is carried out from the reason that gradation is controlled according to regions in a manner that, for example, the contrast of face is softened without changing the contrast of background when the face is recorded with a shadow thereon while the background is clearly recorded such as in a fine weather or, contrary to the above, the contrast of background is hardened without changing the contrast of face recorded such as in a cloudy weather.

By performing such control of gradation, a reproduced color comes closer to a memory color so that a print which gives an impression similar to what people have when the people see the original scene (photographed scene) can be obtained.

Color reproduction parameters are formed in respective regions in the above case. In such processing, those of the principal subject region and the background are formed in some case, while one of them is formed in another case, as the need arises. For example, when the background region is snow, the background comes closer to the memory color by adding a bluish tint so as to give a cold impression. However, if the background only is processed, the face in the principal subject region gains a bluish tint also. In order to prevent this phenomenon, color reproduction parameters relative to the principal subject and background regions are formed while processing the face such as in a manner that the face appears brighter.

The above described color reproduction parameters are formed in the color reproduction forming section 48. As to other parameters which are not formed in this section 48, a value which does not change the value of the image data when the steps 170 and 180 are performed is set as a parameter.

The color reproduction parameter is formed by automatic analysis at the color reproduction parameter forming section 48, and besides, in the step 190, the color reproduction parameter may either be inputted by an operator from an auxiliary inputting section 78 or be selected from among parameters that are beforehand registered on file either systematically or in accordance with customer's instructions and the like. For example, as to the color reproduction parameter of the background, since it is easy to set the parameters in a same manner, gradations corresponding to scenes are prepared and stored, and then a proper one is selected by an operator or by an automatic analysis. In another case, after gradations are adjusted by a customer, the adjusted gradations are registered and a proper one may be selected from among them for putting it into use. As to the gradations corresponding to scenes, a snow gradation in which a highlight portion is in a cyan (C) tone, a sky gradation in which C has a bluish black tint, a mountain gradation in which green is brightened and the like are cited.

In the step 170, a color reproduction parameter of the principal subject region is formed at the color reproduction parameter forming section 48.

In the first place, an image data for analyzing the principal subject region is formed by multiplying prescanned image data read out from the prescan memory 40 into the color reproduction parameter forming section 48 by the weight of the unsharp weighting image. The color reproduction parameter, that is, correction gradation, is calculated from characteristic amounts such as dynamic range, average density value, pixel density distribution, color balances of a highlight portion, a middle portion, a shadow portion and the like. Alternatively, color reproduction parameter of the principal subject region, that is, correction gradation, may be inputted from the auxiliary inputting section 78 by an operator. A correction amount obtained by multiplying the thus obtained correction gradation by the weight of the unsharp weighting image is set in the second LUT 76 as a color reproduction parameter of the principal subject region. This correction amount comprises R, G and B signals, a luminance signal or both, and these signals are to be added to the image data signal.

In this occasion, if the principal subject region is skin having highlight and shadow portions (or regions) thereon with the shadow portion being larger than the other, the gradation softness is increased by putting the highlight portion in center, or, if the principal subject region is skin and its almost entire region is out of a color reproduction range (color gamut), density shift (increasing or decreasing density) into within the color reproduction range (color gamut) is performed so that a satisfactory correction effect can be obtained. Moreover, if the principal subject region is skin and the color balance of its highlight portion is bluish, gradation may be corrected to a magenta (M) tint. Furthermore, gradation of a human individual may not be subjected to gradation hardening. It is preferable that, in the color reproduction parameter forming section 48 according to the present invention, the color reproduction parameter is formed in a manner that at least one of these various processings is performed.

Moreover, it is preferable that color processing to be applied to image data is performed by means of R, G and B signals, a luminance signal, or both.

In the step 180, the color reproduction parameter of the background is formed in the color reproduction forming section 48. In the section 48, an operator performs inputting operation from the auxiliary inputting section 78, or, as described above, various gradation patterns are stored and an appropriate one is selected from among them. A correction amount for the background region obtained by multiplying this color reproduction parameter by the remainder obtained by subtracting the weight of the unsharp weighting image from a reference value, for example, 1is set in the second LUT 76.

In the last step 200, an output image (data) is formed. Image data which is read out from the fine scan memory 42 by the first LUT 70 at the fine scanned image processing section 46 is subjected to gray balance adjustment, brightness (density) correction and gradation correction and then is subjected to saturation correction at MTX 72 and finally the resulting image data is sent to the adder 74.

In the adder 74, this resulting image data is added with the image data sent from the adder 60 (the image (data) obtained by adding the unsharp image (data) with the product of the background image (data) and the remainder obtained by subtracting the weight from a reference value, for example 1, at the adder 60) so that the dodging processing is performed. In this case, since the image (data) sent from the adder 60 is the image data based on the prescanned image data and has the different pixel number (pixel density) from that of the fine scanned image data, this image data sent from the adder 60 is appropriately subjected to the expansion/compression processing.

The second LUT 76 forms output image data by adding the above described correction amount to the thus obtained image data. In other words, as shown in FIG. 4 as a general concept of a method for forming an output image (data), the fine scanned image (data) is added with the number obtained by multiplying the color reproduction parameter of the principal subject region with the weight of the unsharp weighting image, or weighting the color reproduction parameter of the background region with the remainder obtained by subtracting the weight of the unsharp weighting image from a reference value, for example 1, so that the output image (data) is obtained.

Accordingly, since gradations according to respective regions can be controlled in this embodiment, high-quality prints can be obtained without allowing the reproduced color to be departed from the memory color.

Moreover, although the unsharp weighting image (data) is formed from the prescanned image (data) in this embodiment, the unsharp weighting image (data) may be formed from the fine scanned image (data).

While the image processing apparatus according to the present invention has been described above in detail, it should be noted that the invention is by no means limited to the foregoing embodiment and various improvements and modifications may of course be made without departing from the scope and spirit of the present invention.

As described above, the present invention can separate the principal subject region and the background region from each other in the input image and control gradations according to respective regions. As a result, the present invention can reproduce colors near to the memory colors and, therefore, produce high-quality prints, even though the input image is subjected to the dodging processing.

What is claimed is:

1. An image processing apparatus which applies specified image processing to image data read photoelectrically from an image recorded on a film by image reading means so as to form output image data, comprising:

an unsharp weighting image forming section for forming from said image data an unsharp weighting image which connects a principal subject region and a background region smoothly;

a color reproduction parameter forming section for forming at least one of a color reproduction parameter of said principal subject region and a color reproduction parameter of said background region; and an output image forming section for forming the output image data from said image data by using at least one of the color reproduction parameter of said principal subject region which is weighted with a weight of said unsharp weighting image and the color reproduction parameter of said background region which is weighted with the remainder obtained by subtracting the weight of said unsharp weighting image from a reference value.

2. The image processing apparatus according to claim 1, wherein said unsharp weighting image forming section has a region extracting subsection for dividing said image data into said principal subject region and said background region, a weighting mask forming subsection for forming a weighting mask relative to said principal subject region and an unsharp mask processing subsection for subjecting to unsharp mask processing a weighting image which weights the principal subject region so as to form said unsharp weighting image.

3. The image processing apparatus according to claim 2, wherein said region extracting subsection divides said image data into said principal subject region and said background region either automatically or by auxiliary inputting due to an operator and wherein said weighting mask forming subsection forms said weighting mask by analyzing color image data of said principal subject region and then calculating a color balance relative to brightness of said principal subject region and finally setting a weight function which puts said calculated color balance in an intermediate range.

4. The image processing apparatus according to claim 3, wherein said weighting mask forming subsection sets said weight function as a look-up table.

5. The image processing apparatus according to claim 2, wherein said unsharp mask processing subsection forms said unsharp weighting image using the image data obtained by prescanning which reads the image in low resolution by said image reading means prior to fine scanning which reads the image for forming said output image data, and also performs expansion/compression processing of said unsharp weighting image when the output image data is formed from the image data obtained by said fine scanning.

6. The image processing apparatus according to claim 2, wherein said unsharp mask processing subsection forms directly said unsharp weighting image using the image data obtained by fine scanning which reads the image by said image reading means for forming said output image data.

7. The image processing apparatus according to claim 1, wherein said color reproduction parameter forming section forms image data for principal subject area analysis which is obtained by multiplying said image data by the weight of said unsharp weighting image and image data for background area analysis which is obtained by multiplying said image data by the remainder obtained by subtracting the weight of said unsharp weighting image from a reference value, and also forms a color reproduction parameter of the principal subject region by multiplying correction gradation of the principal subject region which is either calculated from characteristic amounts of said image data for said principal subject area analysis and said image data for said background area analysis or inputted by an operator by the weight of said unsharp weighting image, in combination with signals to be added to said image data.

8. The image processing apparatus according to claim 7, wherein the signals to be added to said image data are at least one of R G B signals of three primary colors and a luminance signal.

9. The image processing apparatus according to claim 7, wherein said characteristic amounts include at least one of a dynamic range, an average density, a pixel density distribution, a color balance of a highlight region, a color balance of a middle density region and a color balance of a shadow region.

10. The image processing apparatus according to claim 1, wherein said color reproduction parameter forming section performs at least one of the steps of:

increasing in gradation softness by putting a highlight region in an intermediate range, when said principal subject region is skin and a highlight region and a shadow region exist within the principal subject region and the shadow region is larger than the highlight region;

performing a density shift within a color reproduction range, when said principal subject region is skin and the principal subject region is almost out of the color reproduction range;

correcting into a magenta tint in gradation, when said principal subject region is skin and a color balance of a highlight region of the principal subject region is bluish; and increasing the gradation in hardness with respect to the background but not increasing in gradation hardness with respect to a gradation of a human individual region.

11. The image processing apparatus according to claim 1, wherein color processing relative to said image data is performed by at least one of R, G and B signals of three primary colors and a luminance signal.

12. The image processing apparatus according to claim 1, wherein said color reproduction parameter of said background region is used by inputting a gradation in accordance with a scene prepared previously by an operator or by selecting an appropriate gradation by an image analysis among gradations in accordance with scenes, or otherwise, by selecting an appropriate gradation among gradations which have been adjusted by a user and registered previously.

13. The image processing apparatus according to claim 12, wherein said gradation or gradations in accordance with the scene or scenes include at least one of a snow gradation where the highlight region becomes a cyan tint, a sky gradation where cyan becomes a blue blackish tint and a mountain gradation where green becomes bright green.

14. The image processing apparatus according to claim 1, wherein said reference value is set as 1 and said unsharp weighting image is normalized with 1.

\* \* \* \* \*